United States Patent [19]

Hartrumpf

[11] Patent Number: 5,237,389
[45] Date of Patent: Aug. 17, 1993

[54] DEVICE FOR MEASURING THE POSITIONS AND DIAMETERS OF THE FILAMENTS IN A FILAMENT BUNDLE

[75] Inventor: Matthias Hartrumpf, Karlsruhe, Fed. Rep. of Germany

[73] Assignee: Fraunhofer Gesellschaft zur Forderung der angewandten Forschung e.V., Fed. Rep. of Germany

[21] Appl. No.: 865,639

[22] Filed: Apr. 9, 1992

Related U.S. Application Data

[63] Continuation of Ser. No. 648,851, Jan. 31, 1991.

[30] Foreign Application Priority Data

Jan. 31, 1990 [DE] Fed. Rep. of Germany ....... 4002744

[51] Int. Cl.⁵ .............................................. G01B 9/02
[52] U.S. Cl. ................................... 356/355; 356/238; 356/356; 356/384
[58] Field of Search ............... 356/356, 429, 430, 431, 356/238, 355, 353, 344, 73.1, 384

[56] References Cited

U.S. PATENT DOCUMENTS

| | | | |
|---|---|---|---|
| 3,659,950 | 5/1972 | Troll et al. | 356/238 |
| 3,719,425 | 3/1973 | Leitz et al. | 356/384 |
| 3,812,376 | 5/1974 | Takeyama et al. | 356/354 |
| 4,566,795 | 1/1986 | Matsuura et al. | 356/400 |
| 4,828,392 | 5/1989 | Nomura et al. | 356/356 |

Primary Examiner—Samuel A. Turner
Attorney, Agent, or Firm—Evenson, McKeown, Edwards & Lenahan

[57] ABSTRACT

A device for measuring the positions and the diameters of the filaments in a filament bundle comprising a laser scanner disposed adjacent the filament bundle wherein, in the optical path behind the filament bundle to be measured, are disposed an optical means such as a lens of mirror, as well as a filter preferably in the focal plane of said optical means for filtering out the light share not diffracted, as well as a detector and analysis means. The filter is permeable only for limited portions of the diffraction image, and the detector means measures the intensities at several locations of the diffraction image at the same time. In the analysis means the positions of the filaments are determined on the basis of the measured intensity curves while the diameters of the filaments are determined on the basis of the ratios of the measured intensities.

5 Claims, 5 Drawing Sheets

DEVICE FOR MEASURING THE POSITIONS AND DIAMETERS OF THE FILAMENTS IN A FILAMENT BUNDLE

This is a continuation of application Ser. No. 07/648,851, filed Jan. 31, 1991.

BACKGROUND AND SUMMARY OF THE INVENTION

The present invention relates to a device for measuring the positions and the diameters of the individual filaments in a filament bundle.

Heretofore, the operators of spinning devices have determined the position of the filament bundle by visual inspection. Moreover, it has not been possible to measure the diameter of the individual filaments, except by taking a sample for off-line examination, e.g. by measuring a section taken through a bundle sample and using image-processing systems. Such off-line inspection is expensive in terms of both labour and time.

It is therefore the object of the present invention to provide a device which will permit automatic measurement of the positions and diameters of the filaments in a filament bundle.

This object is achieved in the device according to the invention, wherein the filaments are preferably scanned individually, and may now be measured at the same time in terms of their position and their diameter. The filtering out of light not diffracted or flaring at the filaments permits the determination of the positions of the individual filaments by derivation from the time intervals between the detected signal maxima. In contrast to prior art laser scanner systems, it is also thus possible to measure, with a high degree of accuracy, the positions of filaments having diameters small than the half-width of the laser beam.

The measurement of the intensities of the flaring light, or the light diffracted at the filaments, in at least two different areas of the flaring or diffraction pattern, moreover, allows for the additional measurement of the diameters of the individual fibers, independently of the intensity of the illuminating laser.

Other objects, advantages and novel features of the present invention will become apparent from the following detailed description of the invention when considered in conjunction with the accompanying drawings.

DETAILED DESCRIPTION OF THE DRAWINGS

Since filaments, in particular filaments of a synthetic material, are mostly translucent and or smaller than the diameter of the light spot of a laser scanner, the measuring signal/environmental signal ratio is very small, and is too small when the shadow cast by a filament or a filament bundle is measured measurement based on such shadows is therefore not suitable as a means of determining the position of the filaments. When the O-th order of the diffraction or flaring pattern, i.e. the light not hitting the filaments, is filtered out, a measuring signal/illumination signal ratio is achieved which is substantially higher. It is only this high ratio which allows the detection of the position of a filament in the majority of cases.

Figure 1:
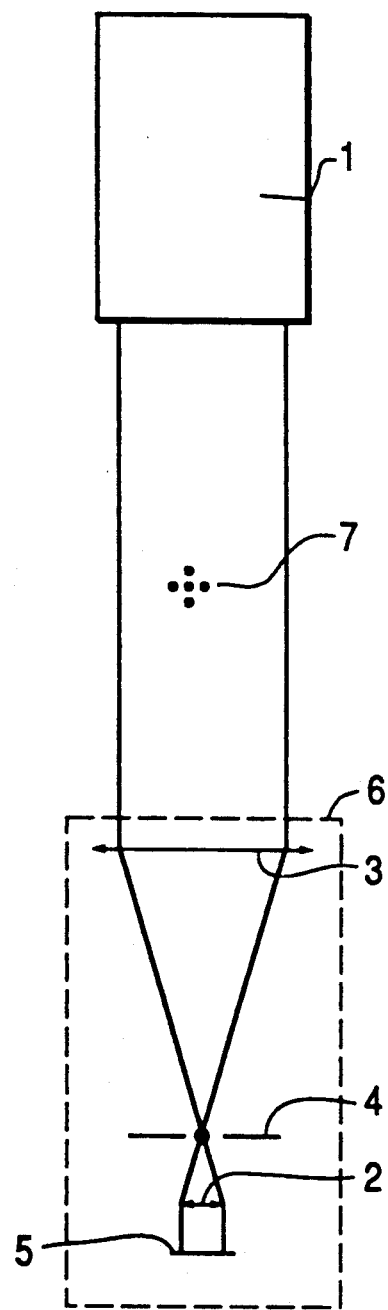
FIG. 1 is a schematic depiction of a measurement device according to the invention.

FIG. 1 shows a device according to the invention for the detection of the position of fiber filaments. The reference numeral 1 designates a laser scanner. Between the laser scanner and the measuring means 6 is disposed the filament bundle 7 to be measured, at a spacing of roughly 0.2–2 m, with the filament bundle lying approximately in the centre. In the measuring means 6 proper, first a lens 3, a filter 4 and a further lens 2 and a detector means 5 are disposed. Instead of a filter, a double slot may be used for the mere positional measurement. The lens 2 may also be omitted. In such a case, however, the sensitive surface of the detector must be larger.

For a more detailed explanation of the novel principle of diameter measurement, first an invariable laser beam is assumed which is precisely oriented with respect to a filament.

The following formula $$I \approx b'\sin^2(\pi\, bx/p\text{\textbullet}\, f1)/\pi\, bx^2/\lambda f1)^2$$

defines the intensity of the light diffracted at a filament at a point x in the focal plane of lens F1, wherein b' corresponds to the filament diameter, $\lambda$ denotes the wavelength of the light, and f1 corresponds to the focal length of lens 3. That formula provides the basis for the calculation of the filament diameter, with a laser beam being directed to the filament, and with application of the measuring methods common for measuring the spacing of the maxima or minima, respectively, of a diffraction pattern, e.g. by means of a line or matrix sensor.

The formula applies for $b' >> \lambda$, i.e. for are values of b' for which the case of Fraunhofer diffraction at the filament.

In the event that b' is not much greater than $\lambda$, the diffraction pattern resulting from the diffraction at the filament in the focal plane of lens 3 must be calculated.

Figure 2:
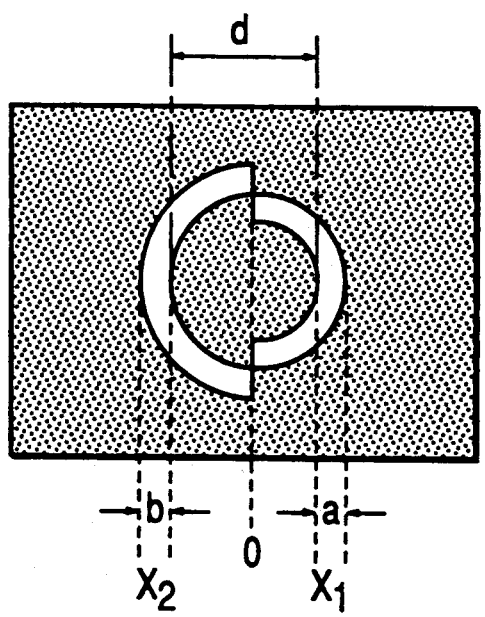
FIG. 2 depicts a filter suitable for use with the measurement device according to the invention.

With a filament orientation variable in space relative to the laser beam, the illuminating beam must be wider than the maximum range of variation of the filament. When more than one filament is present in the detected field, an overlay of the individual signal patterns occurs. In such a case at best a mean value of the diameters can be measured. For this reason the filaments must be scanned individually, e.g. by means of a laser scanner, so as to achieve a measurement of the individual filaments in a bundle. In such a case, however, the time interval during which the laser beam is precisely directed onto an individual filament is normally so short that the above described measuring method can no longer be applied. The diameters of the individual filaments may be measured independently of the intensity of the illuminating beam when a detector means comprising a plurality of isolated detectors is used in combination with a specific filter such as the one proposed according to FIG. 2, as discussed hereinafter when the laser beam is directed precisely onto the filament, an interpretation of the signal measured by means of a photodiode of length a can be derived according to the following formula:

$$\int_{x_1}^{x_1+a} I dx \approx b'^2 \int_{x_1}^{x_1+a} \sin^2(\pi bx/\lambda f_1)/(\pi \cdot bx/\lambda f_1)^2 dx,$$

which furnishes a signal that varies monotonically with b' in the focal plane for a defined range of b' widths. Thus on the basis of measurements of the integral $$\int_{x_1}^{x_1+a} I dx$$

b' may be calculated. Moreover, in that approach and with use of a circular aperture with a joining photodiode, it is not required that the filament be vertical relative to the source of light and to the aperture. The measurement of two intensities, i.e.

$$\int_{x_1}^{x_1+a} I dx \text{ and } \int_{-x_2}^{-x_2-b} I dx$$

using a device according to FIGS. 1 and 2 permits the measurement independently of the intensity of the illuminating laser beam and the detection of the point of time at which the laser beam is precisely directed onto the filament. When the laser beam is accurately aimed at the filament, with an appropriately dimensioned filter, the signal $$\int_{x_1}^{x_1+a} I dx + \int_{-x_2}^{-x_2-b} I dx$$

is at a maximum.

Figure 3:
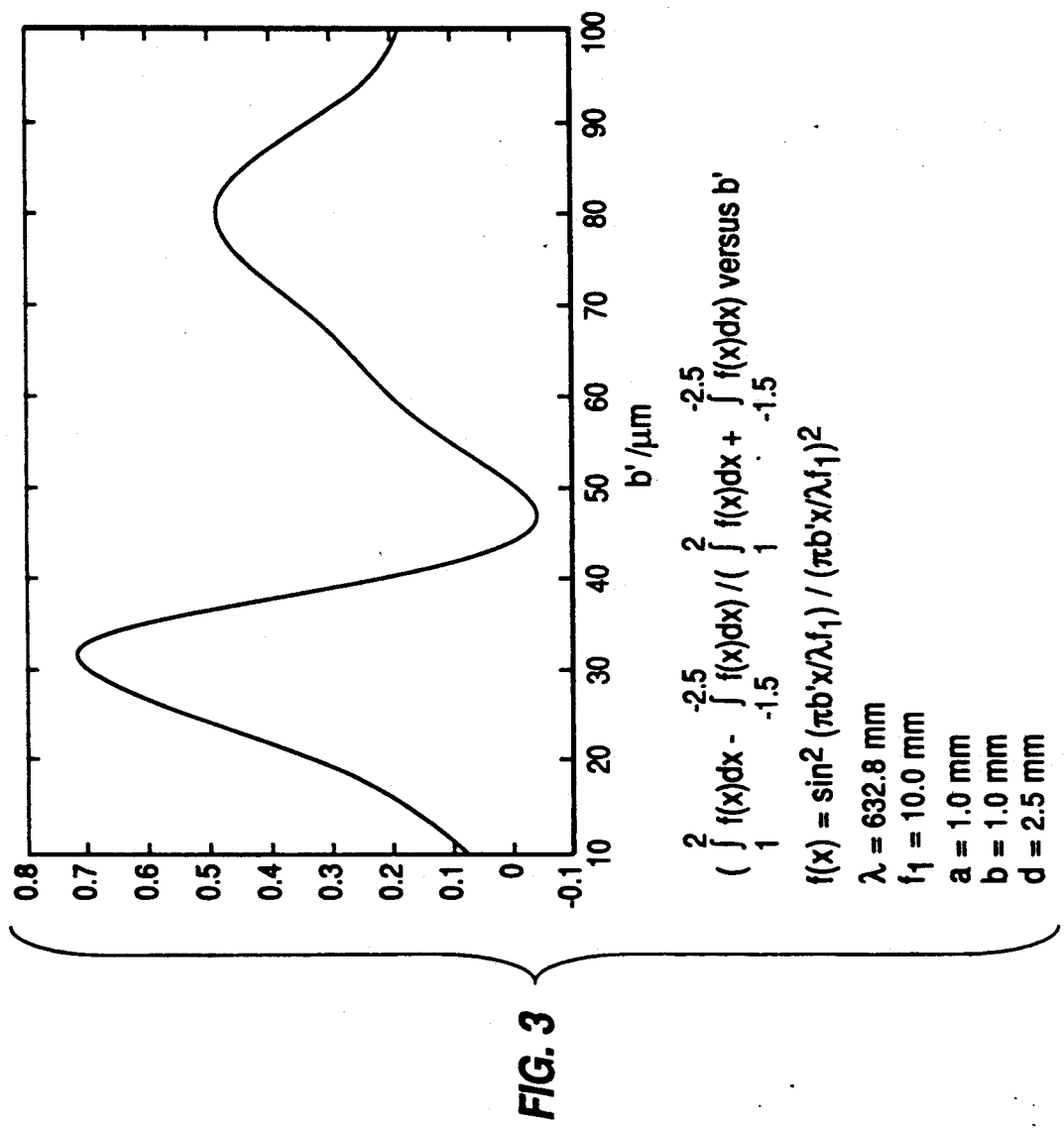
FIG. 3 is a graphic illustration of the results of numerical analysis used in the invention, for a particular set of parameters.
Figure 4:
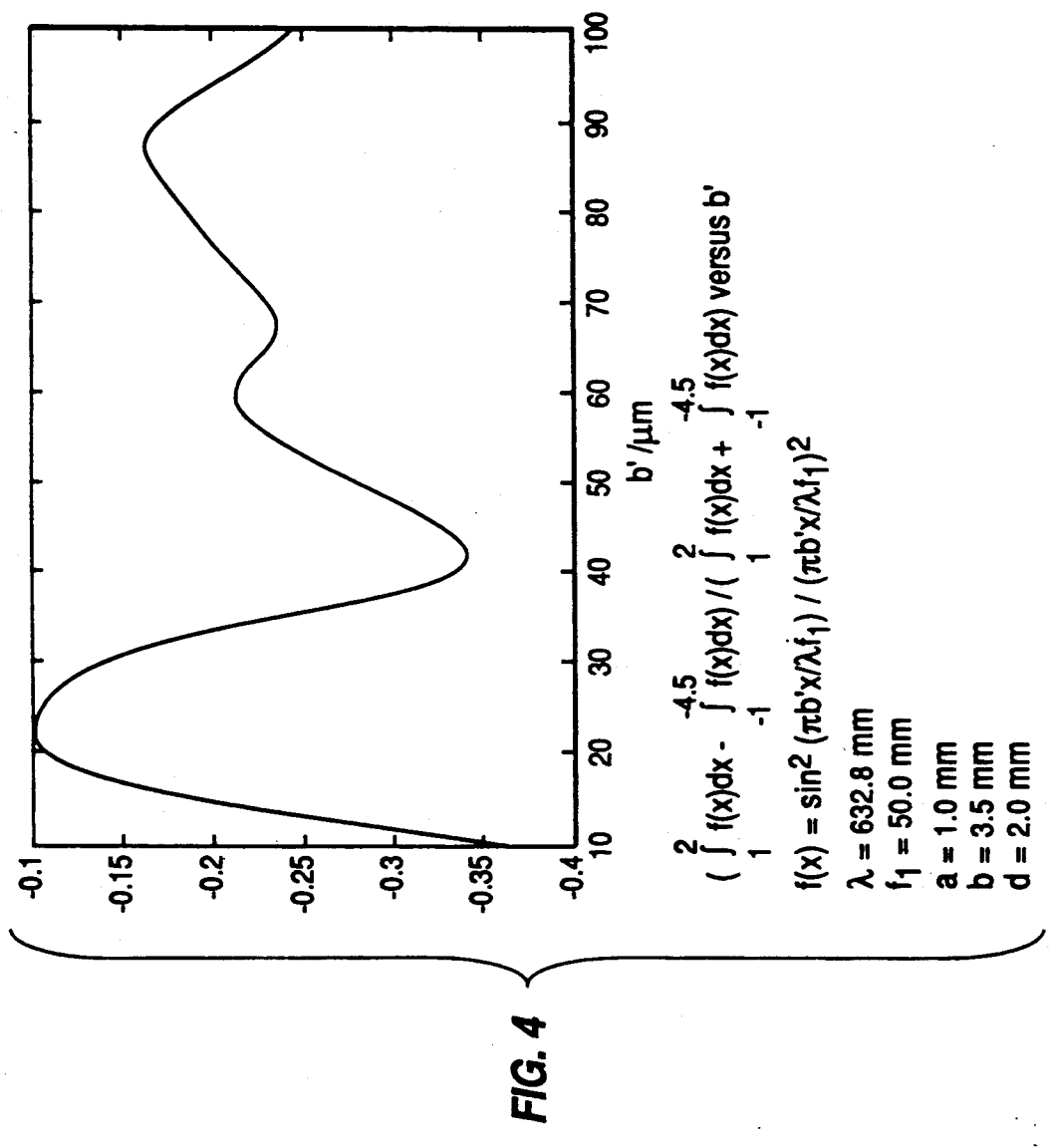
FIG. 4 is a graphic illustration of the results of a numerical analysis, for differing values of such parameters.

FIGS. 3 and 4 are graphic depictions of numerical analyses of the ratio $$\left( \int_{x_1}^{x_1+a} I dx - \int_{-x_2}^{-x_2-b} I dx \right) /$$

$$\left( \int_{x_1}^{x_1+a} I dx + \int_{-x_2}^{-x_2-b} I dx = F(b') \right)$$

with different parameters as indicated therein. By way of parameter optimization it is possible to achieve then the monotonic dependence of function F(b') over a wide range of b'. In such a case the filament diameters may be measured within that wide range b' independently of the intensity of the illuminating beam.

FIG. 2 illustrates a specific filter, with annulus segments being so disposed that the signal of the 0-th order may be filtered out, while the signals of the n-th to k-th or from the m-th to the l-th orders of diffraction, respectively, may hit the detectors measuring the integrals over the total intensities of the diffraction of flaring pattern in the above defined areas, which integrals are calculated as described above.

The annuli may present, for instance, the inner diameter X1, X2, and the widths a, b (cf. the legends applying to FIGS. 3 and 4).

Figure 5:
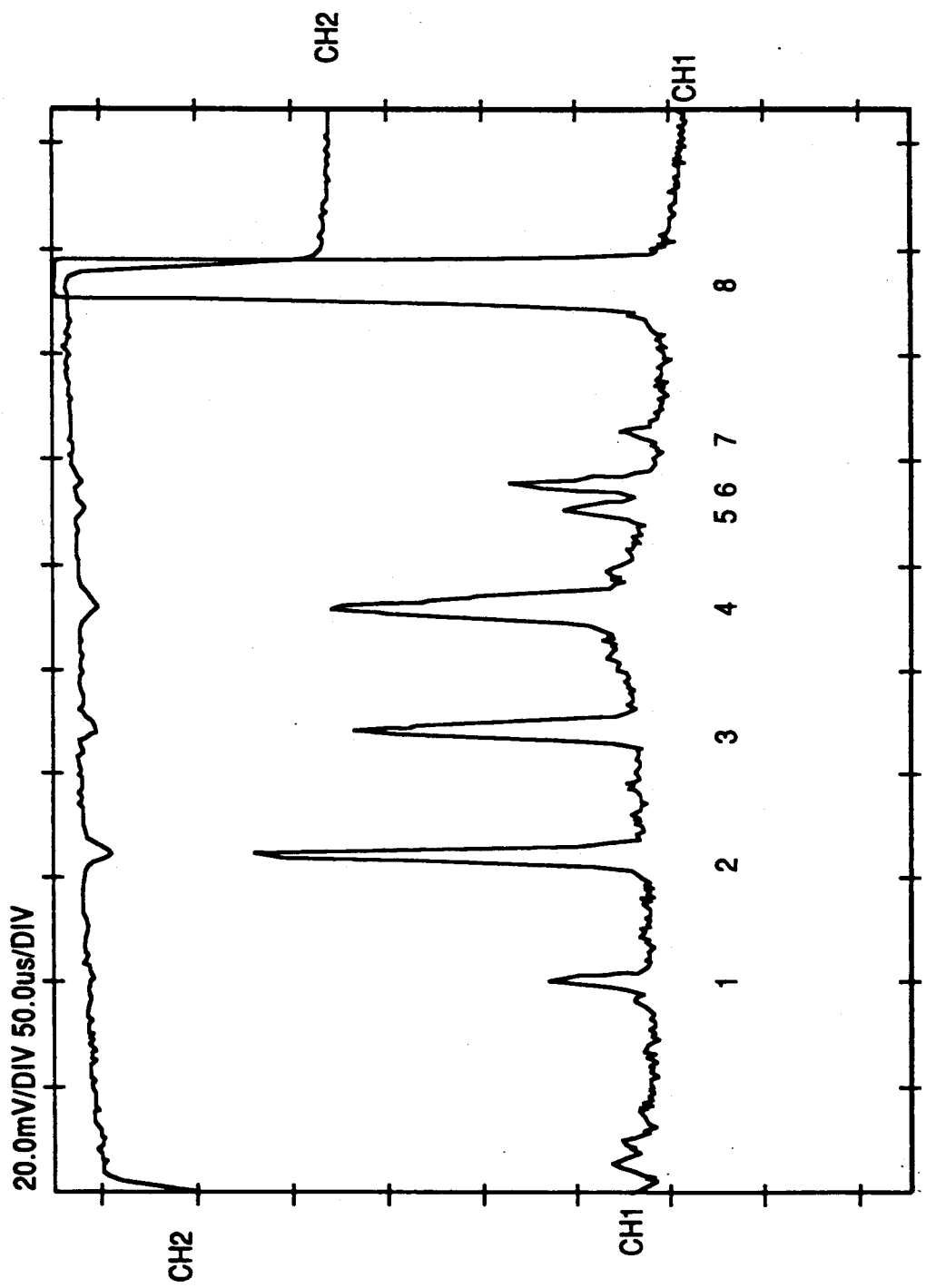
FIG. 5 is a graphic comparison of the results of measurement according to the invention (CH1) and by a prior art device (CH2).

FIG. 5 also illustrates the measurement of position by means of the inventive device, wherein channel 1 (CH 1) represents the inventive device while channel 2 (CH 2) corresponds to a prior art device.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Device for measuring the positions and the diameters of the filaments in a filament bundle, comprising a laser scanner disposed adjacent the filament bundle to be measured, an optical element disposed adjacent said filament bundle and positioned so as to receive light which has been diffracted by the filaments in said filament bundle, a filter disposed in a focal plane of said optical element for filtering out light not diffracted by said filaments, and means for detecting and analyzing light transmitted by said filter, wherein said filter is permeable only for limited portions of a diffraction image generated by said diffracted light and said detector means is adpated to measure light intensities at several locations of said diffraction image simultaneously, said analysis means being adapted to determine the positions of the filaments on the basis of measured intensity signals and to determine the diameters of the filaments on the basis of the ratios of the measured intensity signals.

2. Device according to claim 1, wherein said detector means is composed of a plurality of photodiodes.

3. Device according to claim 1, wherein said means for detecting and analyzing is adapted to measure light intensity at selected areas of the diffraction pattern of the filaments.

4. Device according to claim 1, wherein said filter is permeable to two annulus segments having different radii $x_1$, $x_2$.

5. Device according to claim 1, wherein an optical path between said laser scanner and said means for detecting and analyzing is disposed approximately perpendicular to the filament bundle.

* * * * *